United States Patent
Tasker

(10) Patent No.: US 7,558,246 B2
(45) Date of Patent: Jul. 7, 2009

(54) SELECTING A ROUTING MODE FOR A CALL SESSION

(75) Inventor: Michael E. Tasker, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 605 days.

(21) Appl. No.: 11/018,328

(22) Filed: Dec. 21, 2004

(65) Prior Publication Data
US 2006/0133367 A1 Jun. 22, 2006

(51) Int. Cl.
H04L 12/66 (2006.01)

(52) U.S. Cl. .......... 370/351; 370/392; 370/401; 370/463

(58) Field of Classification Search .......... 370/351–356, 370/392, 400, 401, 419–421, 463; 709/217–219; 379/211.01, 211.02, 216.01, 221.14, 221.15
See application file for complete search history.

(56) References Cited

U.S. PATENT DOCUMENTS

| | | | | |
|---|---|---|---|---|
| 5,862,202 A * | 1/1999 | Bashoura et al. | ....... | 379/100.14 |
| 5,953,404 A * | 9/1999 | Fikis et al. | ....... | 379/230 |
| 6,058,169 A * | 5/2000 | Bramnick et al. | ....... | 379/100.01 |
| 6,363,079 B1 * | 3/2002 | Barzegar et al. | ....... | 370/465 |
| 6,526,058 B1 * | 2/2003 | Czajkowski et al. | ....... | 370/352 |
| 6,625,256 B1 | 9/2003 | Tasker et al. | ....... | 379/32.04 |
| 6,687,245 B2 * | 2/2004 | Fangman et al. | ....... | 370/356 |
| 7,068,647 B2 * | 6/2006 | Fangman et al. | ....... | 370/352 |
| 7,218,722 B1 * | 5/2007 | Turner et al. | ....... | 379/221.02 |
| 2002/0042832 A1 * | 4/2002 | Fallentine et al. | ....... | 709/230 |
| 2002/0176404 A1 | 11/2002 | Girard | ....... | 370/352 |
| 2003/0091028 A1 | 5/2003 | Chang et al. | ....... | 370/352 |
| 2005/0053222 A1 * | 3/2005 | Lee et al. | ....... | 379/219 |

FOREIGN PATENT DOCUMENTS

CN 1318931 A 10/2001

OTHER PUBLICATIONS

"Cisco Survivable Remote Site Telephony", Data Sheet, Cisco Systems, Inc., Copyright © 1992-2003, Cisco Systems, Inc., 7 pages.
"Cisco CallManager Express", Data Sheet, Cisco Systems, Inc., Copyright © 1992-2004, Cisco Systems, Inc., 15 pages.

(Continued)

Primary Examiner—Wing F Chan
Assistant Examiner—Duc T Duong
(74) Attorney, Agent, or Firm—Baker Botts L.L.P.

(57) ABSTRACT

Routing a call includes receiving a request to initiate a call session for a call from a caller endpoint to a callee endpoint, where the caller endpoint belongs to an internal network. Whether the call is internal or external is determined. A routing mode is selected in accordance with the determination, and the call is routed according to the selected routing mode.

16 Claims, 1 Drawing Sheet

OTHER PUBLICATIONS

"*SIP Survivable Remote Site Telephony (SRST)*", Cisco Systems, Inc., Cisco IOS Release 12.2(15)ZJ, 12.3(4)T, and 12.3(11)T, Copyright © 2003-2004, Cisco Systems, Inc., 68 pages.

"*Cisco IOS Network Address Translation*", White Paper, Cisco Systems, Inc., Copyright © 2004, Cisco Systems, Inc., 11 pages.

PCT Notification of Transmittal of the International Search Report and the Written Opinion of the International Searching Authority, or the Declaration with attached PCT International Search Report and Written Opinion of the International Searching Authority in International Application No. PCT/US05/44276, dated Nov. 29, 2006, 11 pages.

State Intellectual Property Office of the People's Republic of China, Text of the First Office Action, Application No. 200580033968.3, 10 pages, Oct. 30, 2008.

* cited by examiner

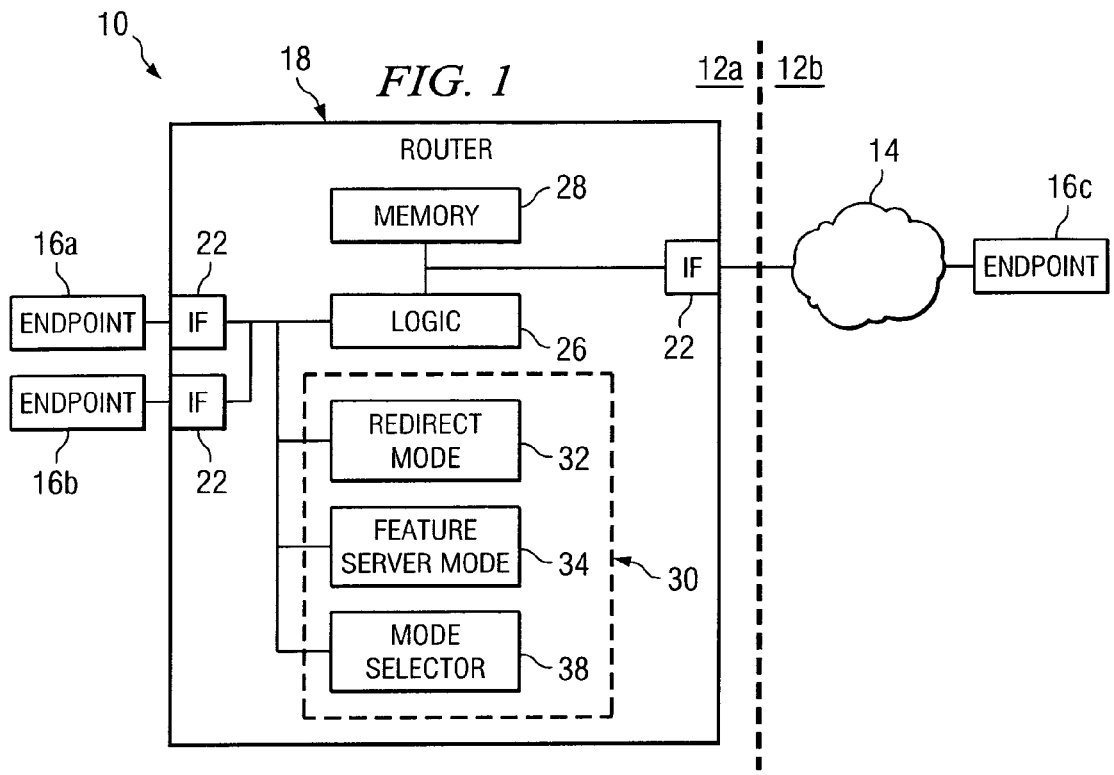
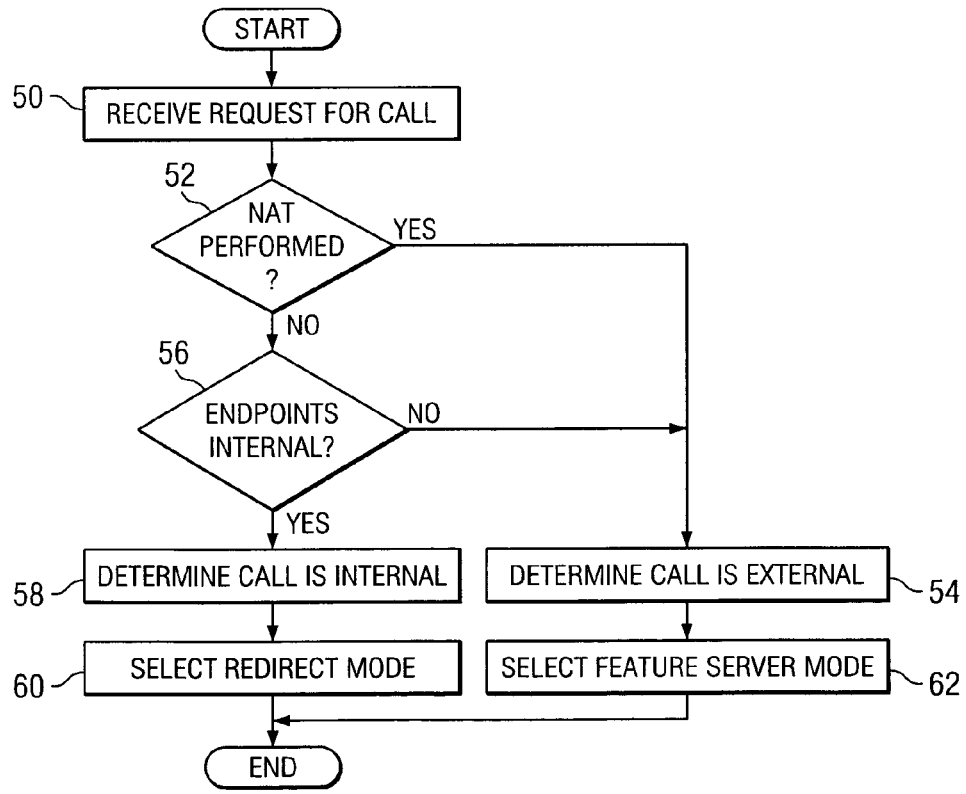

US 7,558,246 B2

SELECTING A ROUTING MODE FOR A CALL SESSION

TECHNICAL FIELD

This invention relates generally to the field of telecommunications and more specifically to selecting a routing mode for a call session.

BACKGROUND

A network comprises components supporting communication between endpoints. Routing calls among endpoints of a local area network and endpoints of another network typically involves processes such as address translation and protocol conversion. These processes, however, use network resources. Accordingly, routing calls may not be sufficiently efficient in certain situations.

SUMMARY OF THE DISCLOSURE

In accordance with the present invention, disadvantages and problems associated with previous techniques for routing a call session may be reduced or eliminated.

According to one embodiment of the present invention, routing a call includes receiving a request to initiate a call session for a call from a caller endpoint to a callee endpoint, where the caller endpoint belongs to an internal network. Whether the call is internal or external is determined. A routing mode is selected in accordance with the determination, and the call is routed according to the selected routing mode.

Certain embodiments of the invention may provide one or more technical advantages. A technical advantage of one embodiment may be a routing mode for a call session may be selected according to whether the call session is an internal call among internal endpoints. Selecting a redirection mode instead of a feature server mode for internal calls may increase efficiency.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram of one embodiment of a network system that includes an internal network coupled to an external network; and FIG. 2 is a flowchart of one embodiment of a method for selecting a mode for routing a call session.

DETAILED DESCRIPTION OF THE DRAWINGS

Embodiments of the present invention and its advantages are best understood by referring to FIGS. 1 and 2 of the drawings, like numerals being used for like and corresponding parts of the various drawings.

FIG. 1 is a block diagram of one embodiment of a network system 10 that includes an internal network 12a coupled to an external network 12b. Internal network 12a includes endpoints 16a-b and a router 18 coupled as shown, and external network 12b includes a network 14 and endpoint 16c coupled as shown. In general, router 18 may select a routing mode for a call between endpoints 16 according to whether endpoints 16 are regarded as internal.

According to the illustrated embodiment, network system 10 includes internal network 12a and external network 12b. A network may represent any suitable combination or arrangement of components supporting communication between endpoints. A network may comprise a local area network (LAN), a wide area network (WAN), a public switched telephone network (PSTN), the Internet, other suitable communications network, or any combination of the preceding. As an example, internal network 12a may comprise a local area network, and external network 12b may comprise one or more other networks.

Components that are members of the same network may be managed by the same managing device. As an example, internal network 12a may be managed by a call manager. Components that are managed separately, that is, managed by separate managing devices, may be referred to as substantially distinct networks. As an example, internal network 12a may be distinct from external network 12b, that is, internal network 12a may be managed by one call manager and external network 12b may be managed by another call manager.

Internal network 12a may use addresses that are not provided to external network 12b. For example, endpoints 16a-b may have RFC 1918 private addresses, private IP addresses, or both. Internal addresses may be useful when providing external addresses for each endpoint 16 of internal network 12a is impractical. Internal addresses may also allow for more efficient addition of endpoints 16 to internal network 12a.

Internal network 12a and external network 12b include endpoints 16. An endpoint represents any suitable combination or arrangement of logic for providing communication services such as telephony services. Logic may refer to hardware, software, or any suitable combination of hardware and software. Examples of a communication device may include a telephone, a cell phone, a personal digital assistant, a voice appliance, an answering machine, a facsimile machine, a computer, a server, or other device operable to communicate with a communication network.

Internal endpoints 16 of a network 12 may refer to endpoints 15 that are operable to directly communicate with each other, and may communicate with each other using a redirect mode. An internal endpoint 16 of a network 12 may typically refer to a device that is a member of the network 12. Other devices, however, may be defined as internal endpoints 16 according to specified internal endpoint rules.

The following may be considered as internal endpoints 16 according to example internal endpoint rules:

(1) an endpoint 16 that has registered with router 18, for example, has an active Session Initiation Protocol (SIP) with router 18;

(2) an endpoint 16 that has a corresponding configuration file at router 16;

(3) an endpoint 16 that is maintained at an address resolution protocol (ARP) list at router 16;

(4) an endpoint 16 that is a client of a service, such as a dynamic host configuration protocol (DHCP) service, router 16;

(5) an endpoint 16 that has been designated as internal by, for example, manual configuration. The designation may override one or more other rules; and (6) an endpoint 16 for which there is a request for router 18 to provide a call service such as a call forwarding service.

Endpoints 16 may be engaged in call session. A call session may refer to an arrangement between endpoints 16 that allows for the exchange of information between endpoints 16. A call session involves the transfer of packets between endpoints 16. A packet may comprise a bundle of data organized in a specific way for transmission, and a frame may comprise the payload of one or more packets organized in a specific way for transmission. A packet may carry any suitable information such as voice, data, multimedia, other information, or any combination of the preceding.

An endpoint 16 may initiate a call session to place a call to another endpoint 16. An internal call refers to a call between internal endpoints 16. An external call refers to a call between endpoints 16 of different networks 12. An external call typically involve network address translation. Network address translation translates between external and internal addresses in order to communicate streams between internal and external endpoints 16. As an example, NAT may translate IP addresses embedded within H.323/SIP protocol messages. Accordingly, whether network address translation would be required may be used to identify external calls.

An external call may also cross a communication interface. A communication interface may refer to an interface that conversion between communication protocols. The conversion may occur between any suitable protocols, such as any two of Internet Protocol (IP), H.323 protocol, or Session Initiation Protocol (SIP). As an example, endpoint 16a may comprise an IP telephone. A call from endpoint 16a to endpoint 16c may cross an interface that conversion between Internet Protocol and H.323 protocol or Session Initiation Protocol. As another example, conversion may occur between two of the same protocols, for example, between interal SIP and external SIP.

Router 18 represents any suitable combination or arrangement of logic for routing calls. Router 18 may provide termination points between internal network 12a and external network 12b. For example, a media stream, a signaling stream, or both media and signaling streams may terminate at router 18. Router 18 may route streams to internal endpoints 16a-b using internal addresses and to external endpoints 16c using external addresses. Router 18 may also provide protocol conversion between an internal protocol of internal network 12a and an external protocol of external network 12b, and may also provide network address translation between external and internal addresses.

According to one embodiment, endpoints 16 may use a registration operation, such as an SIP-SRST registrar operation, to register with router 18. Endpoints 16 may register using the registration operation to provide an directory of endpoint identifiers and their corresponding internal addresses. As an example, an endpoint identifier for an endpoint 16 may represent a phone number for the endpoint 16, and an internal address may represent an internal IP address for the endpoint 16. Router 18 may use the directory to route calls between internal endpoints 16.

Router 18 selects a routing mode for a call between endpoints 16. A routing mode may refer to a procedure used to route a call session. According to one embodiment, router 18 selects a routing mode according to whether endpoints 16 are internal. As an example, router 18 receives a request to initiate a call session between internal caller endpoint 16a to a callee endpoint 16. Router 18 determines whether callee endpoint 16 is an internal endpoint, and selects either a redirect mode or a feature server mode as a routing mode in accordance with the determination.

According to the illustrated embodiment, router 18 includes one or more interfaces (I/F) 22, logic 26, memory 28, and one or more modules 30 coupled as shown. An interface 22 receives and sends packets. An interface may refer to any suitable structure of a device operable to receive input for the device, send output from the device, or both, and may comprise one or more ports.

Logic 26 manages the operation of router 18, and may comprise any suitable hardware, software, or combination of hardware and software. For example, logic 26 may include a processor. A processor may refer to any suitable device operable to execute instructions and manipulate data to perform operations. Memory 28 stores and facilitates retrieval of information used by logic 26, and may include Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

According to the illustrated embodiment, modules 30 include a redirect mode 32, a feature server mode 34, and a mode selector 38. Redirect mode 32 may be used to route internal calls among internal endpoints 16a-b. A redirect mode refers to a routing mode in which a router routes a call from a caller endpoint to a callee endpoint by providing the caller endpoint with the address of the callee endpoint, allowing the caller endpoint to communicate directly with the callee endpoint. Redirect mode 32 may avoid processing such as network address translation and protocol conversion.

According to one embodiment, redirect mode 32 may operate according to SIP. For example, router 18 may receive a SIP INVITE request from internal caller endpoint 16a placing a call to internal callee endpoint 16b. Router 18 may respond with a redirection message that includes the internal address corresponding to callee endpoint 16b. A redirection message may comprise, for example, a SIP 302 "moved temporarily response" message, a SIP 300 "multiple choice" message, or other message operable to communicate the internal address corresponding to callee endpoint. Caller endpoint 16a then contacts callee endpoint 16b by directly sending a SIP INVITE message to callee endpoint 16b. Router 18 has no further involvement in the call.

Feature server mode 34 may be used to route external calls between internal endpoint 16a and external endpoint 16c. A feature server mode may refer to a routing mode that involves translation or conversion such as address translation or protocol conversion. Router 18 may perform address translation since internal endpoint 16a may have an internal address that is not visible to external endpoint 16c. Router 18 may also perform protocol conversion to convert the call from an internal protocol to an external protocol. According to one embodiment, feature server mode 34 may comprise a back-to-back user agent (B2BUA) operation. For example, a B2BUA operation may convert protocols in order to allow internal skinny IP calls to be converted to external SIP or H.323 calls.

According to one embodiment, feature server mode 34 may also be used to provide services for certain calls. Services may include call blocking, call forwarding, high-touch call conditioning, or other suitable services. Feature server mode 34 may also provide for the application of rules or policies for specific calls.

Mode selector 38 selects between redirect mode 32 and feature server mode 34. According to one embodiment, mode selector 38 may select redirect mode 32 for internal calls and feature server mode 34 for external calls. As an example, mode selector 38 may select the mode according to the method described with reference to FIG. 2. Mode selector 138, however, may select a mode using any suitable method.

Mode selector 38 may respond to a configuration entry, for example, an entry that overrides one mode over another mode. According to one embodiment, a configuration entry may override redirect mode 32 and force feature server mode 34, or vice-versa. The configuration entry may place additional restrictions on specific endpoints 16. For example, feature server mode 34 may be used to provide an Internet working operation to an internal voice mail system of an endpoint 16 to avoid SIP transactions that are not supported. As an another example, feature server mode 34 may be used to create specific billing records for a call session or to assert control of parameters for the call session.

Router 18 may be provisioned in any suitable manner. As an example, provisioning information may be entered and stored directly into the configuration of router 18. As another example, provisioning information may be obtained dynamically from endpoints 16.

Modifications, additions, or omissions may be made to router 18 without departing from the scope of the invention. The components of router 18 may be integrated or separated according to particular needs. Moreover, the operations of router 18 may be performed by more, fewer, or other modules. For example, the operations of redirect mode 32 and feature server mode 34 may be performed by one module, or the operations of redirect mode 32 may be performed by more than one module. Additionally, operations of router 18 may be performed using any suitable logic comprising software, hardware, other logic, or any suitable combination of the preceding.

External network 12b includes network 14 and endpoint 16c. Network 14 comprises any suitable network operable to communicate with endpoint 16c. Endpoint 16c comprises any suitable endpoint operable to communicate with network 14.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic comprising software, hardware, other logic, or any suitable combination of the preceding. As used in this document, "each" refers to each member of a set or each member of a subset of a set.

FIG. 2 is a flowchart of one embodiment of a method for selecting a mode for routing a call session. According to the embodiment, redirect mode 32 may be selected for internal calls, and feature server mode 34 may be selected for external calls. The method begins at step 50, where router 18 receives a request from a caller endpoint 16 to initiate a call session with a callee endpoint 16. The request includes a caller address and a callee address.

Mode selector 38 determines whether network address translation would be required at step 54. Network address translation may be required if the caller address and the callee address are incompatible. The addresses may be incompatible if, for example, one of the addresses is an internal address and the other is an external address. According to one embodiment, the network address translation is performed if it would be required. According to another embodiment, the network address translation may be bypassed by invoking the feature server mode. If network address translation would be required, the method proceeds to step 54, where the call is determined to be external. If network address translation would not be required, the method proceeds to step 56.

Mode selector 38 determines whether caller and callee endpoints are both internal at step 54. The determination may be made in any suitable manner. For example, the determination may be made in accordance with an internal endpoint rule. If caller and callee endpoints are not both internal, the method proceeds to step 54, where the call is determined to be external. If caller and callee endpoints are both internal, the method proceeds to step 58, where the call is determined to be internal.

If the call is an external call at step 54, mode selector 38 initiates feature server mode 34 at step 62. After initiating feature server mode 38, the method terminates. If the call is an internal call at step 58, mode selector 38 initiates redirect mode 34 at step 60. After initiating redirect mode 34, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be a routing mode for a call session may be selected according to whether the call session is an internal call among endpoints of the same internal network. Selecting a redirection mode instead of a feature server mode for internal calls may increase efficiency. A technical advantage of another embodiment may be that a routing mode may be selected according to whether a call session involves network address translation. Selecting a feature mode instead of a redirection mode for calls that involve network address translation may increase efficiency.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for routing a call, comprising:
receiving a request to initiate a call session for a call from a caller endpoint to a callee endpoint, the caller endpoint being of a plurality of internal endpoints belonging to an internal network of a network system, each internal endpoint having a configuration file within the internal network;
determining whether the call is internal or external by:
determining that the call is internal if the callee endpoint has a configuration file within the internal network; and
determining that the call is external if the callee endpoint has an external address that is provided to the internal network and the external network;
selecting a routing mode in accordance with the determination by:
selecting a direct mode if the call is internal; and
selecting a feature server mode if the call is external, the feature server mode comprising converting the call between an internal communication protocol of the internal network and an external communication protocol of an external network; and
routing the call according to the selected routing mode.

2. The method of claim 1, wherein the redirect mode further comprises providing the caller endpoint with an address of the callee endpoint, the address allowing the caller endpoint to communicate directly with the callee endpoint.

3. The method of claim 1, wherein determining whether the call is internal or external further comprises:
establishing whether network address translation would be required; and determining that the call is external if network address translation would be required.

4. The method of claim 1, wherein determining whether the call is internal or external further comprises:
establishing whether the caller endpoint and the callee endpoint are internal endpoints; and
determining that the call is internal if the caller endpoint and the callee endpoint are internal endpoints.

5. A network device for routing a call, comprising:
an input operable to receive a request to initiate a call session for a call from a caller endpoint to a callee endpoint, the caller endpoint being of a plurality of internal endpoints belonging to an internal network of a network system, each internal endpoint having a configuration file within the internal network;
a mode selector coupled to the input and operable to:
determine whether the call is internal or external by:
determining that the call is internal if the callee endpoint has a configuration file within the internal network; and
determining that the call is external if the callee endpoint has an external address that is provided to the internal network and the external network;
select a routing mode in accordance with the determination by:
selecting a direct mode if the call is internal; and
selecting a feature server mode if the call is external, the feature server mode comprising converting the call between an internal communication protocol of the internal network and an external communication protocol of an external network; and
route the call according to the selected routing mode.

6. The network device of claim 5, further comprising a redirect mode module operable to provide the caller endpoint with an address of the callee endpoint, the address allowing the caller endpoint to communicate directly with the callee endpoint.

7. The network device of claim 5, further comprising a feature server mode module operable to convert the call between an internal communication protocol of the internal network and an external communication protocol of an external network.

8. The network device of claim 5, the mode selector operable to determine whether the call is internal or external by:
establishing whether network address translation would be required; and
determining that the call is external if network address translation would be required.

9. The network device of claim 5, the mode selector operable to determine whether the call is internal or external by:
establishing whether the caller endpoint and the callee endpoint are internal endpoints; and
determining that the call is internal if the caller endpoint and the callee endpoint are internal endpoints.

10. Logic for routing a call, the logic embodied in a medium and operable to:
receive a request to initiate a call session for a call from a caller endpoint to a callee endpoint, the caller endpoint being of a plurality of internal endpoints belonging to an internal network of a network system, each internal endpoint having a configuration file within the internal network;
determine whether the call is internal or external by:
determining that the call is internal if the callee endpoint has a configuration file within the internal network; and
determining that the call is external if the callee endpoint has an external address that is provided to the internal network and the external network;
select a routing mode in accordance with the determination by:
selecting a direct mode if the call is internal; and
selecting a feature server mode if the call is external, the feature server mode comprising converting the call between an internal communication protocol of the internal network and an external communication protocol of an external network; and
route the call according to the selected routing mode.

11. The logic of claim 10, wherein the redirect mode further comprises providing the caller endpoint with an address of the callee endpoint, the address allowing the caller endpoint to communicate directly with the callee endpoint.

12. The logic of claim 10, wherein the feature server mode further comprises converting the call between an internal communication protocol of the internal network and an external communication protocol of an external network.

13. The logic of claim 10, operable to determine whether the call is internal or external by:
establishing whether network address translation would be required; and
determining that the call is external if network address translation would be required.

14. The logic of claim 10, operable to determine whether the call is internal or external by:
establishing whether the caller endpoint and the callee endpoint are internal endpoints; and
determining that the call is internal if the caller endpoint and the callee endpoint are internal endpoints.

15. A system for routing a call, comprising:
means for receiving a request to initiate a call session for a call from a caller endpoint to a callee endpoint, the caller endpoint being of a plurality of internal endpoints belonging to an internal network of a network system, each internal endpoint having a configuration file within the internal network;
means for determining whether the call is internal or external by:
determining that the call is internal if the callee endpoint has a configuration file within the internal network; and
determining that the call is external if the callee endpoint has an external address that is provided to the internal network and the external network;
means for selecting a routing mode in accordance with the determination by:
selecting a direct mode if the call is internal; and
selecting a feature server mode if the call is external, the feature server mode comprising converting the call between an internal communication protocol of the internal network and an external communication protocol of an external network; and
means for routing the call according to the selected routing mode.

16. A method for routing a call, comprising:
receiving a request to initiate a call session for a call from a caller endpoint to a callee endpoint, the caller endpoint being of a plurality of internal endpoints belonging to an internal network of a network system, each internal endpoint having a configuration file within the internal network;
determining whether the call is internal or external by:
determining that the call is internal if the callee endpoint has a configuration file within the internal network;

determining that the call is external if the callee endpoint has an external address that is provided to the internal network and the external network;
establishing whether network address translation would be required;
determining that the call is external if network address translation would be required;
if network address translation would not be required, establishing whether the caller endpoint and the callee endpoint are internal endpoints, and determining that the call is internal if the caller endpoint and the callee endpoint are internal endpoints;
selecting a routing mode in accordance with the determination, the routing mode selected from a redirect mode and a feature server mode, the redirect mode further comprising providing the caller endpoint with an address of the callee endpoint, the address allowing the caller endpoint to communicate directly with the callee endpoint, the feature server mode further comprising converting the call between an internal communication protocol of the internal network and an external communication protocol of an external network, the routing mode selected in accordance with the determination by:
selecting the redirect mode if the call is internal; and
selecting the feature server mode, otherwise; and
routing the call according to the selected routing mode.

* * * * *